United States Patent
Kaizu et al.

(10) Patent No.: US 7,126,774 B2
(45) Date of Patent: Oct. 24, 2006

(54) MAGNETIC RECORDING AND REPRODUCING APPARATUS

(75) Inventors: Akimasa Kaizu, Tokyo (JP); Makoto Moriya, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/135,439

(22) Filed: May 24, 2005

(65) Prior Publication Data
US 2006/0044660 A1 Mar. 2, 2006

(30) Foreign Application Priority Data
Aug. 25, 2004 (JP) ............................. 2004-244809

(51) Int. Cl.
*G11B 5/09* (2006.01)
*G11B 5/02* (2006.01)

(52) U.S. Cl. .......................................... 360/46; 360/67

(58) Field of Classification Search ..................... None
See application file for complete search history.

(56) References Cited

U.S. PATENT DOCUMENTS

| 2003/0021053 A1* | 1/2003 | Sakai | .......................... 360/67 |
| 2005/0094299 A1* | 5/2005 | Tokizono et al. | ............. 360/31 |

FOREIGN PATENT DOCUMENTS

JP     A 6-195907     7/1994

* cited by examiner

*Primary Examiner*—Andrew L. Sniezek
(74) *Attorney, Agent, or Firm*—Oliff & Berridge,

(57) ABSTRACT

A magnetic recording and reproducing apparatus includes a separator and first and second amplifiers. The separator separates a servo data signal and a user data signal, both reproduced by a reproducing head. The first and second amplifiers are connected to the output stage of the separator to increase the amplitude ratio of the servo data signal to the user data signal. The magnetic recording and reproducing apparatus can precisely decode the servo data along with the user data, and can achieve a highly precise servo control.

20 Claims, 11 Drawing Sheets

| Amplitude ratio of SS to YS [%] | Number of track address read errors in servo data section | Error rate (bit error rate) in user data section |
|---|---|---|
| 50 | 15 | $2.6 \times 10^{-6}$ |
| 60 | 10 | $1.5 \times 10^{-6}$ |
| 70 | 0 | Less than $1.0 \times 10^{-7}$ |
| 80 | 0 | Less than $1.0 \times 10^{-7}$ |
| 90 | 0 | Less than $1.0 \times 10^{-7}$ |
| 100 | 0 | Less than $1.0 \times 10^{-7}$ |

MAGNETIC RECORDING AND REPRODUCING APPARATUS

BACKGROUND OF THE INVENTION

1. Field of the Invention

The present invention relates to a magnetic recording and reproducing apparatus having a magnetic recording medium such as a discrete track medium or other media.

2. Description of the Related Art

Magnetic recording and reproducing apparatuses having a magnetic recording medium such as a discrete track medium or other media are widely known as a conventional magnetic recording and reproducing apparatus capable of high-density storage, and described in, for example, Japanese Patent Laid-Open Publication No. Hei 6-195907.

The magnetic recording medium used in such conventional magnetic recording and reproducing apparatus comprises, for example, a servo data section SD and a user data section YD as shown in FIG. 12. In the servo data section SD, a special pattern, called a position detection mark for tracking (servo pattern), is formed. The special pattern is formed by physically separating a magnetic layer ML of the same material as the one used for the user data section YD, and is, for example, magnetized in one direction by an external magnetic field to store a magnetic signal.

In the conventional magnetic recording and reproducing apparatus, however, a magnetic signal in the user data section YD can have two-directional polarization, whereas a magnetic signal in the servo data section SD can only have one-directional polarization. Therefore, as shown in FIGS. 13A and 13B, the servo data signal SS is reproduced with an amplitude of about half the amplitude of the user data signal YS. A problem with this is that the data error rate of the servo data signal SS tends to increase due to its smaller amplitude in comparison with the amplitude of the user data signal YS, preventing a precise servo control.

SUMMARY OF THE INVENTION

In view of the foregoing problems, various exemplary embodiments of this invention provide a magnetic recording and reproducing apparatus that can precisely decode servo data along with user data and can achieve a highly precise servo control.

The inventor of the present invention, as a result of diligent research, has found out a magnetic recording and reproducing apparatus that can precisely decode servo data along with user data and can achieve a highly precise servo control.

(1) A magnetic recording and reproducing apparatus having a magnetic recording medium including a user data section capable of storing user data and a servo data section in which servo data is formed by a predetermined concavo-convex pattern formed by a magnetic layer, the magnetic recording and reproducing apparatus comprising:

a separation device for separating a servo data signal and a user data signal, both reproduced by a reproducing head; and a gain changing device connected to an output stage of the separation device to increase an amplitude ratio AS/AY between the servo data signal having an amplitude AS and the user data signal having an amplitude AY.

(2) The magnetic recording and reproducing apparatus according to (1), wherein the gain changing device is configured to amplify the amplitudes of the servo data signal and the user data signal with different amplifications, and an amplification to the servo data signal is set to greater than an amplification to the user data signal.

(3) The magnetic recording and reproducing apparatus according to (1), wherein the gain changing device is configured to attenuate the amplitudes of the servo data signal and the user data signal with different attenuations, and an attenuation to the servo data signal is set to less than an attenuation to the user data signal.

(4) The magnetic recording and reproducing apparatus according to (1), wherein the gain changing device is configured to amplify only the amplitude of the servo data signal.

(5) The magnetic recording and reproducing apparatus according to (1), wherein the gain changing device is configured to attenuate only the amplitude of the user data signal.

(6) The magnetic recording and reproducing apparatus according to any one of (2) to (5), wherein the amplification or attenuation of the gain changing device can be adjusted.

(7) The magnetic recording and reproducing apparatus according to any one of (1) to (6), wherein an average of the amplitude ratios is set to a value in a range of 70% to 100%.

(8) The magnetic recording and reproducing apparatus according to any one of (1) to (7), further comprising an amplifying devices connected to an input stage of the separation devices to amplify the servo data signal and the user data signal before separating them.

The magnetic recording and reproducing apparatus according to various exemplary embodiments of this invention has a magnetic recording medium including a user data section capable of storing user data and a servo data section in which servo data is formed by a predetermined concavo-convex pattern formed using a magnetic layer, and comprises: a separation device for separating a servo data signal and a user data signal, both reproduced by a reproducing head; and a gain changing device connected to an output stage of the separation device to increase an amplitude ratio AS/AY of the servo data signal having an amplitude AS and the user data signal having an amplitude AY. The magnetic recording and reproducing apparatus according to the present invention can thereby precisely decode the servo data along with the user data and achieve a highly precise servo control.

The magnetic recording and reproducing apparatus according to various exemplary embodiments of this invention has an excellent effect that both servo data and user data can be precisely decoded and a highly precise servo control can be achieved.

DETAILED DESCRIPTION OF THE PREFERRED EXEMPLARY EMBODIMENT

First to fifth exemplary embodiments according to the present invention will be described in detail below with reference to the attached drawings.

First, a magnetic recording and reproducing apparatus according to the first exemplary embodiment of the invention will be described with reference to FIG. 1.

Figure 1:
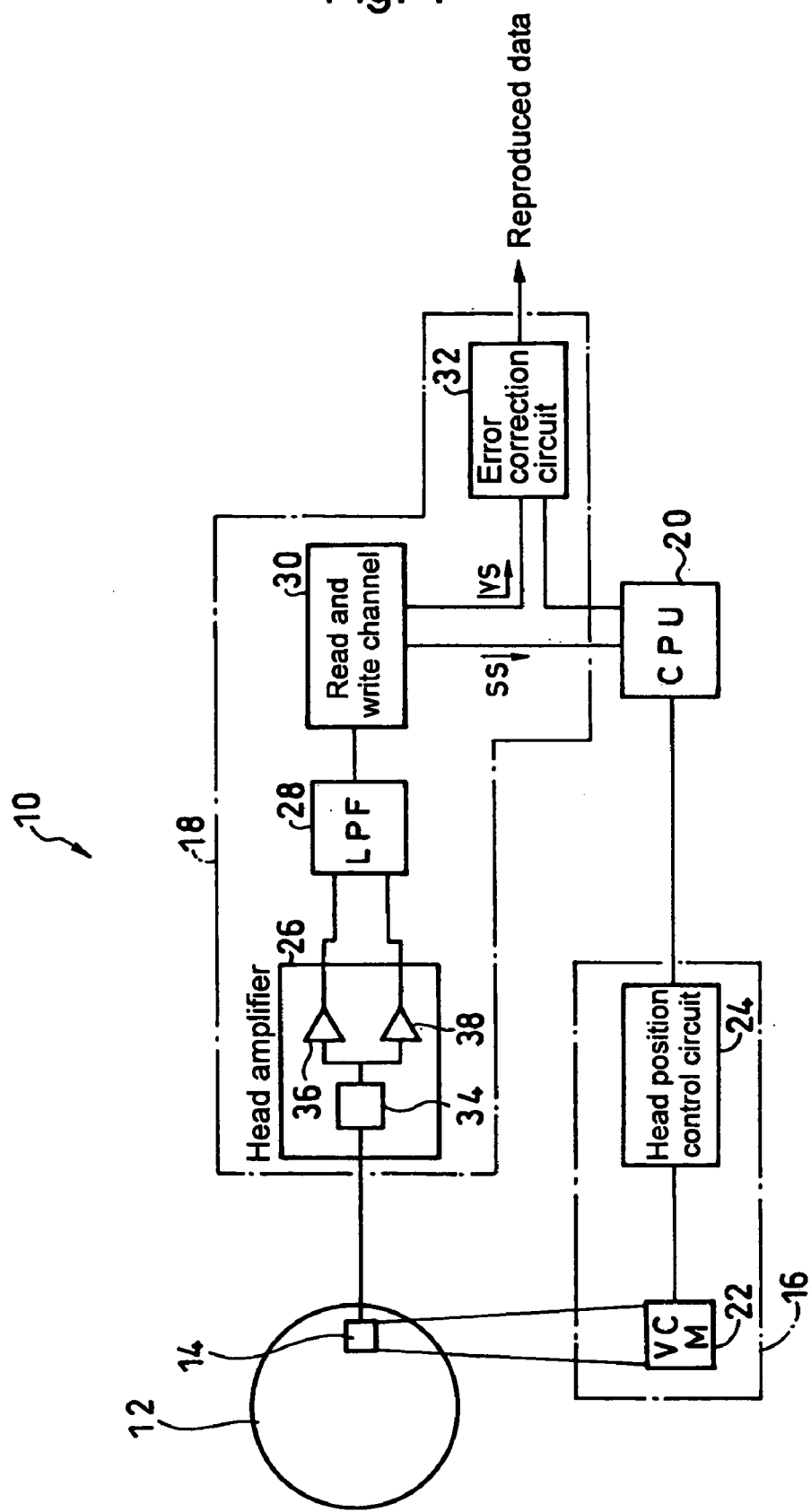
FIG. 1 is a block diagram of a magnetic recording and reproducing apparatus according to a first exemplary embodiment of the present invention.

As shown in FIG. 1, the magnetic recording and reproducing apparatus 10 according to the first exemplary embodiment comprises: a discrete track medium 12 having a disk shape; a reproducing head 14 for reproducing magnetization information stored in the discrete track medium 12; a servo controller 16 for driving the reproducing head 14; a signal processor 18 for decoding the magnetization information reproduced by the reproducing head 14; and a central processing unit (CPU) 20 for controlling the servo controller 16 and the signal processor 18.

Servo data sections SD and user data sections YD are formed on the discrete track medium 12 so that they are aligned alternately toward the circumference.

In the servo data sections SD, a predetermined concavo-convex pattern is formed using a magnetic layer (magnetic material) to form servo data. The servo data section SD stores address data including track numbers and sector numbers, a burst code for detecting a relative position between a track on the discrete track medium 12 and the reproducing head 14, and other data.

In the user data section YD, a predetermined concavo-convex pattern is formed using a magnetic layer, in which a plurality of recording tracks are substantially concentrically formed by the convex portions of the concavo-convex pattern and are magnetically separated from each other by a plurality of grooves concentrically formed by the concave portions of the concavo-convex pattern. This user data section YD stores user data as magnetization information.

The servo controller 16 comprises a voice coil motor (VCM) 22 capable of driving the reproducing head 14 and a head position control circuit 24.

The signal processor 18 comprises a head amplifier 26, a low pass filter (LPF) 28, a read and write channel 30, and an error correction circuit 32. The head amplifier 26 receives the servo data signal SS and the user data signal YS reproduced by the reproducing head 14. (the servo data signal SS and the user data signal YS will sometimes be referred to below together as a reproducing signal.) The LPF 28 removes the noise of the reproducing signal, the gain of which is adjusted by the head amplifier 26. The read and write channel 30 decodes the reproducing signal and performs other operations. The error correction circuit 32 performs error correction of the user data signal YS output from the read and write channel 30.

Figure 2:
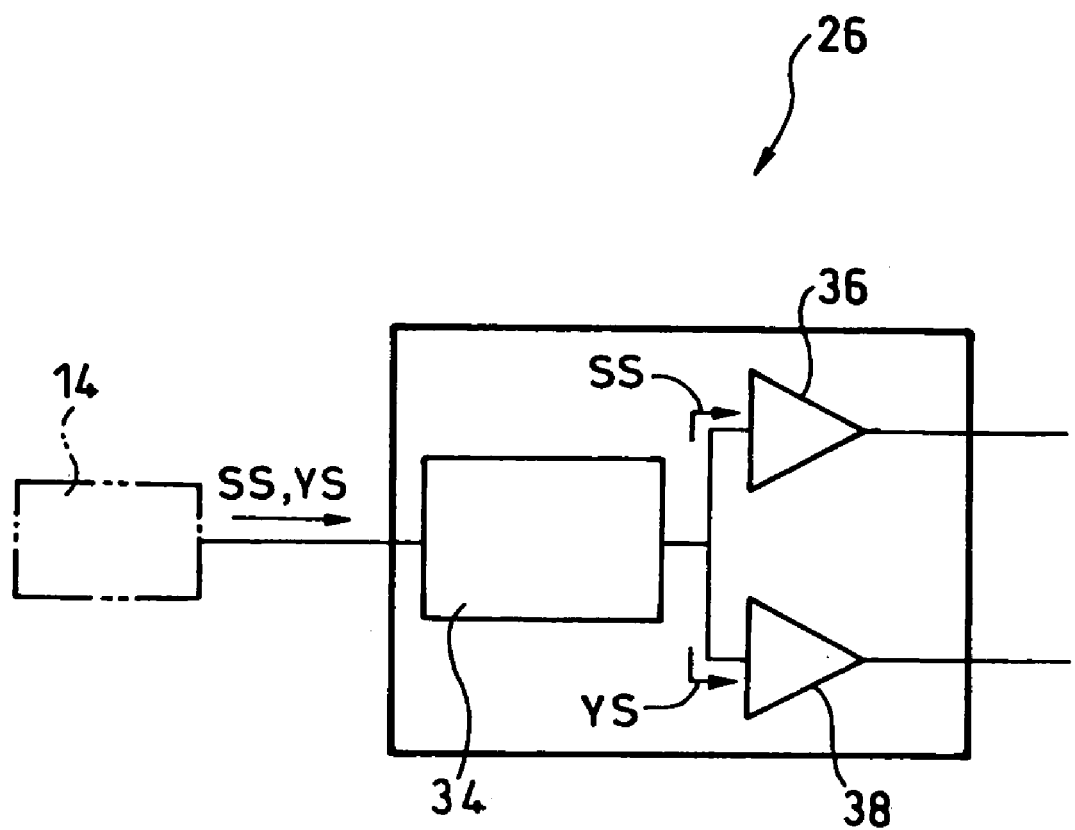
FIG. 2 is a block diagram of a head amplifier in the magnetic recording and reproducing apparatus in FIG. 1.

As shown in the enlarged drawing of FIG. 2, the head amplifier 26 in the signal processor 18 comprises: a separator (separation device) 34 for separating the servo data signal SS and the user data signal YS reproduced by the reproducing head 14; and two of first and second amplifiers (gain changing device) 36 and 38 connected to the output stage of the separator 34.

The servo data signal SS and the user data signal YS separated by the separator 34 are input to the first amplifier 36 and the second amplifier 38, respectively. The first and second amplifiers 36 and 38 are configured such that they can amplify the amplitudes of the servo data signal SS and the user data signal YS with respective different amplifications. According to the first exemplary embodiment, the amplifications are set such that the amplification AMP1 of the first amplifier 36 is larger than the amplification AMP2 of the second amplifier 38 (AMP1>AMP2).

Returning to FIG. 1, the CPU 20 is connected to the read and write channel 30 and the error correction circuit 32 in the signal processor 18 so that it can control them and can obtain the address information, the amplitude information of a burst code, and other information each stored in the servo data section SD. The CPU 20 is also connected to the head position control circuit 24 in the servo controller 16 to control the position of the reproducing head 14 on the basis of the address information, the amplitude information of the burst code, and other information each obtained from the signal processor 18. In addition to the position control of the reproducing head 14, the CPU 20 also performs the revolution control of the discrete track medium 12 and other controls.

Next, the operation of the magnetic recording and reproducing apparatus 10 according to the first exemplary embodiment will be described.

Figure 3A:
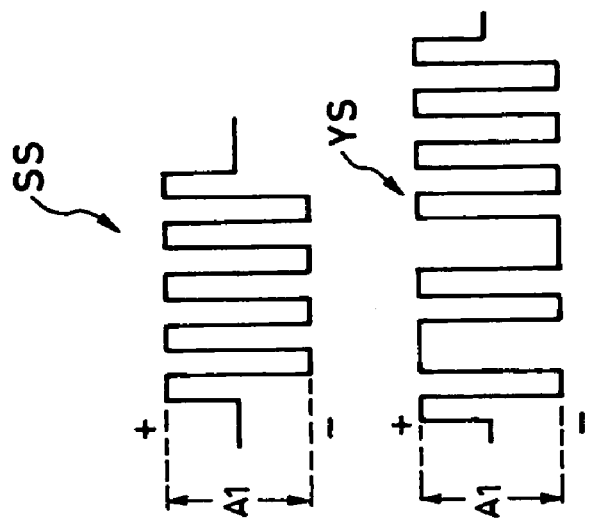
FIG. 3A schematically illustrates a reproducing signal before separation in the magnetic recording and reproducing apparatus in FIG. 1.

The CPU 20 performs the revolution control of the discrete track medium 12, the position control of the reproducing head 14, and other controls, whereby the servo data signal SS and the user data signal YS shown in FIG. 3A are continuously reproduced from the reproducing head 14.

The servo data signal SS and the user data signal YS reproduced by the reproducing head 14 are input to the separator 34 in the head amplifier 26, and are separated from each other by this separator 34. There are various possible methods for separating the servo data signal SS and the user data signal YS. Among these, the separator 34 according to the first exemplary embodiment detects a unique pattern P (dibit pulse of the servo mark) generated between the servo data signal SS and the user data signal YS and changes the output destinations of the reproducing signal in response to the timing when the unique pattern P is detected, thereby separating the servo data signal SS and the user data signal YS.

The amplitudes of the servo data signal SS and the user data signal YS thus separated from each other are amplified by the first amplifier 36 and the second amplifier 38, respectively. In the first exemplary embodiment, since the amplitudes of the servo data signal SS and the user data signal YS can be separately amplified after they have been separated from each other, the amplitude of the user data signal YS can be optimized so as to meet the operation range of the error correction circuit 32.

Figure 3B:
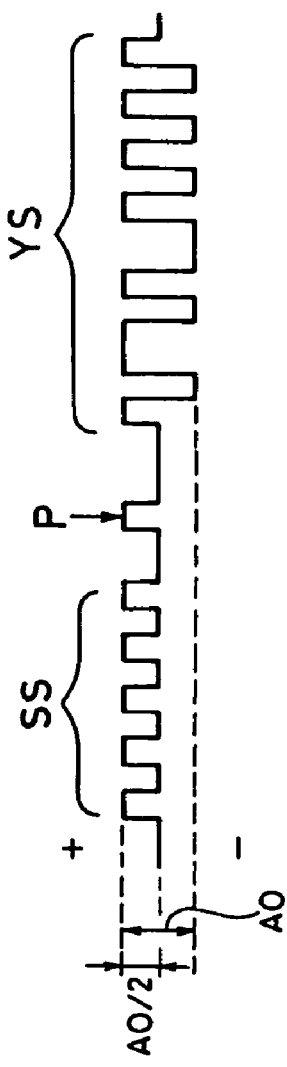
FIG. 3B schematically illustrates the reproducing signal after the separation in the magnetic recording and reproducing apparatus in FIG. 1.

As described above, according to the first exemplary embodiment, the amplification AMP1 of the first amplifier 36 (for the servo data signal SS) is set to be larger than the amplification AMP2 of the second amplifier 38 (for the user data signal YS). Accordingly, the servo data signal SS and the user data signal YS output from the respective first and second amplifiers 36 and 38 produce waveforms as shown in FIG. 3B. Thus, an amplitude ratio AS1/AY1 (=A1/A1=1) obtained from the ratio between the servo data signal SS having an amplitude AS1 (=A1) and the user data signal YS having an amplitude AY1 (=A1) becomes greater than an amplitude ratio of ½(=(A0/2)/A0) obtained from the ratio between the servo data signal SS having an amplitude of A0/2 and the user data signal YS having an amplitude of A0 before separation, as shown in FIG. 3A.

The servo data signal SS and the user data signal YS, the amplitudes of which are thus amplified, are decoded by the read and write channel 30 after their noises have been removed by the LPF 28. Then, while the servo data signal SS is output to the CPU 20, the user data signal YS is output to the error correction circuit 32 in which the error is corrected and the corrected user data signal is output as reproduced data.

The inventor of the present invention performed an experiment by using both the magnetic recording and reproducing apparatus 10 of the first exemplary embodiment and a conventional magnetic recording and reproducing apparatus to collect data on the bit error rate of the user data and the number of errors that occurred in reading the track address of the servo data. In the experiment, the track address was read from the servo data signal SS input to the read and write channel 30, and the servo data signal SS and the user data signal YS were reproduced using a giant magnetoresistive (GMR) reproducing head having a read width of 120 nm as the reproducing head 14. The data were collected under the conditions described below.

The discrete track medium 12 was placed in between the magnetic poles of an electromagnet having a direct magnetic field of 15 kOe so that its surface was substantially in parallel therewith, and a perpendicular magnetic recording layer in the servo data section SD was magnetized in one step to record the servo data signal. The user data signal was recorded using the discrete track medium 12 rotated at a rotational speed of 4200 rpm, the head having a flying height of 11 nm, and the perpendicular magnetic recording head having a write width of 200 nm. Further, the perpendicular magnetic recording layer had magnetic characteristics in which a saturation magnetization was 350 emu/cc, a remanent saturation magnetization was 340 emu/cc, the thickness of the perpendicular magnetic recording layer was 15 nm, the recording density of the servo data section SD was 130 kFRPI, the recording density of the user data section YD was 200 kFCI, the track pitch was 200 nm, and the track width was 110 nm.

As a result of the experiment, in the conventional magnetic recording and reproducing apparatus, the number of errors in reading the track address was 15 and the bit error rate was $2.6 \times 10^{-6}$, whereas, in the magnetic recording and reproducing apparatus 10 of the first exemplary embodiment, the number of errors in reading the track address was 0 (zero) and the bit error rate was $1.0 \times 10^{-7}$ or less.

Further, from the experiment, the inventor of the present invention collected data on a relationship among the amplitude ratio AS/AY, the number of track address read errors, and the bit error rate, where AS and AY indicate the amplitudes of the servo data signal SS and the user data signal YS, respectively.

Figures 4, 5:
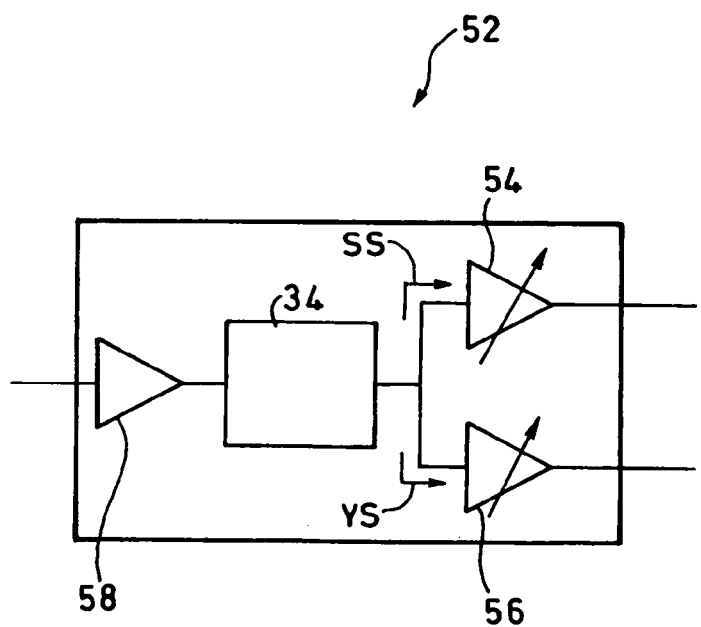
FIG. 4 illustrates the relationship among the amplitude ratio AS/AY of a servo data signal having an amplitude AS and a user data signal having an amplitude AY, the number of track address read errors, and a bit error rate in the magnetic recording and reproducing apparatus according to both the first exemplary embodiment of the invention and a conventional example.
FIG. 5 is a block diagram of a head amplifier in a magnetic recording and reproducing apparatus according to a second exemplary embodiment of the present invention.

As a result, as shown in FIG. 4, if the average of the amplitude ratios AS/AY of the servo data signal SS having an amplitude AS and the user data signal YS having an amplitude AY is set to a value in the range of 70 to 100%, it has been found that the track address read error is 0 (zero) and the bit error rate is $1.0 \times 10^{-7}$ or less. This implies that the amplifications AMP1 and AMP2 of the respective first and second amplifiers 36 and 38 in the first exemplary embodiment are preferably set so that the average of the above amplitude ratios AS/AY is in the range of 70 to 100%.

According to the further inventor's experiment, even if the average of the above amplitude ratios AS/AY exceeds 100%, (as long as distortion or the like does not occur in the servo data signal SS) it has been found that the bit error rate is generally as good as less than or equal to $1.0 \times 10^{-7}$. Accordingly, the upper limit of the average of the above amplitude ratios AS/AY is not necessarily 100%. Taking the occurrence of distortion in the servo data signal SS, complexity of the circuit design in the signal processor 18, and the like into consideration, however, the upper limit of the average of the above amplitude ratios AS/AY may be preferably about 130%, which implies that the average of the amplitude ratios AS/AY is preferably in the range of 70 to 130%.

The magnetic recording and reproducing apparatus 10 according to the first exemplary embodiment comprises the separator (separation device) 34 and the first and second amplifiers (gain changing device) 36 and 38. The separator 34 separates the servo data signal SS and the user data signal YS reproduced by the reproducing head 14. The first and second amplifiers 36 and 38 are connected to the output stage of the separator 34 to increase the amplitude ratio AS/AY of the servo data signal SS having an amplitude AS and the user data signal YS having an amplitude AY. Therefore, both the servo data and the user data can be precisely decoded, thereby achieving a highly precise servo control.

Further, as described above, if the amplifications AMP1 and AMP2 of the respective first and second amplifiers 36 and 38 are set so that the average of the above amplitude ratios AS/AY is in the range of 70 to 100%, the servo data can be more precisely decoded.

In the first exemplary embodiment, the first and second amplifiers 36 and 38 of the gain changing device have been configured such that the amplitudes of the servo data signal SS and the user data signal YS are amplified with the different amplifications AMP 1 and AMP2, respectively, and AMP1 is set to a value larger than AMP2. The present invention, however, can adopt other configurations.

Accordingly, for example, the gain changing device can be configured such that the amplitudes of the servo data signal SS and the user data signal YS are attenuated with different attenuations and the attenuation of the servo data signal SS is set to less than that of the user data signal YS, thereby obtaining the same effect as the magnetic recording and reproducing apparatus 10 according to the first exemplary embodiment. (This concept can be similarly applicable to second and fifth exemplary embodiments described below.)

Next, a magnetic recording and reproducing apparatus according to a second exemplary embodiment of the present invention will be described with reference to FIG. 5.

The magnetic recording and reproducing apparatus 50 (not shown) according to the second exemplary embodiment employs a head amplifier 52 shown in FIG. 5 in place of the head amplifier 26 in the magnetic recording and reproducing apparatus 10 of the first exemplary embodiment described above. The other structure is the same as in the magnetic recording and reproducing apparatus 10 of the first exemplary embodiment, so only the head amplifier block is shown and descriptions of the other structure will be omitted (similarly, repeated descriptions will be omitted also in the exemplary embodiments described below).

The head amplifier 52 in the magnetic recording and reproducing apparatus 50 comprises: the separator 34 described above; two of first and second variable gain amplifiers 54 and 56; and a pre-amplifier (amplifying device) 58 provided at the input stage of the separator 34 to amplify both the servo data signal SS and the user data signal YS.

Figure 6A:
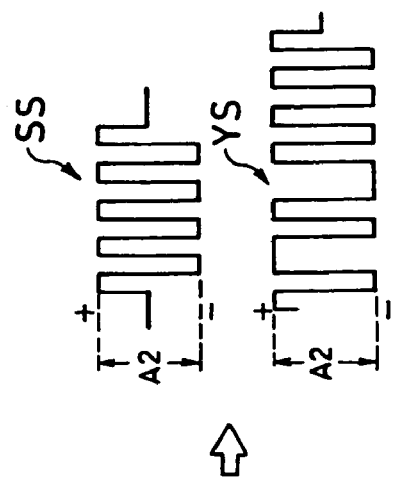
FIG. 6A schematically illustrates a reproducing signal before separation in the magnetic recording and reproducing apparatus in FIG. 5.
Figure 6B:
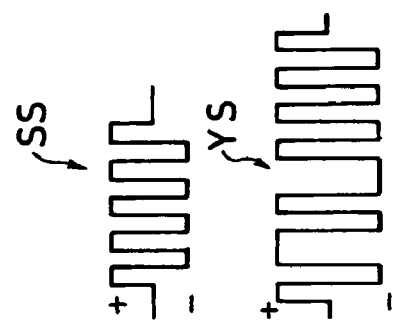
FIG. 6B schematically illustrates the reproducing signal after the separation and before gain adjustment in the magnetic recording and reproducing apparatus in FIG. 5.
Figure 6C:
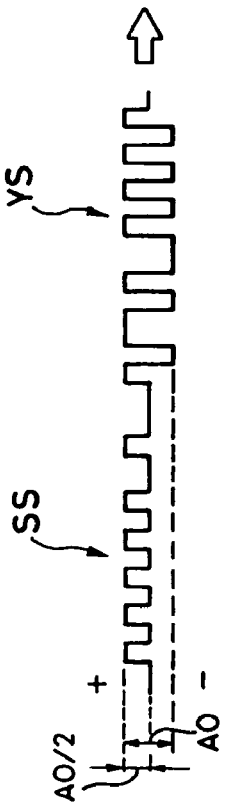
FIG. 6C schematically illustrates the reproducing signal after the gain adjustment in the magnetic recording and reproducing apparatus in FIG. 5.

In the magnetic recording and reproducing apparatus 50 of the second exemplary embodiment, the servo data signal SS and the user data signal YS reproduced by the reproducing head 14 are first amplified by the pre-amplifier 58, after which they are separated from each other by the separator 34 and produce waveforms shown in FIG. 6B. The amplitudes of the servo data signal SS and the user data signal YS, which have been separated from each other, are amplified (or attenuated) by the first and second variable gain amplifiers 54 and 56, respectively. The amplifications (or attenuations) of the first and second variable gain amplifiers 54 and 56 according to the second exemplary embodiment are adjustable, so that the amplification (or attenuation) of the first variable gain amplifier 54 is set to a value greater (or less) than the amplification (or attenuation) of the second variable gain amplifier 56. Therefore, the servo data signal SS and the user data signal YS output from the respective first and second variable gain amplifiers 54 and 56 produce waveforms shown in FIG. 6C. Thus, an amplitude ratio of 1 (=A2/A2) obtained from the ratio between the servo data signal SS and the user data signal YS, both having an amplitude of A2, becomes greater than an amplitude ratio of ½ obtained from the ratio between the servo data signal SS having an amplitude of A0/2 and the user data signal YS having an amplitude of A0 before separation, as shown in FIG. 6A.

According to the magnetic recording and reproducing apparatus 50 of the second exemplary embodiment, the amplifications (or attenuations) of the first and second variable gain amplifiers (gain changing device) 54 and 56 are configured to be adjustable. Therefore, the amplitudes of the servo data signal SS and the user data signal YS can be easily adjusted, so that the amplitudes can be optimized according to, for example, individual differences of the magnetic recording media.

Further, since the pre-amplifier (amplifying device) 58 for amplifying the servo data signal SS and the user data signal YS, which have not yet been separated from each other, is provided at the input stage of the separator (separation device) 34, both the servo data signal SS and the user data signal YS can be amplified together by a single amplifier.

In the second exemplary embodiment, the pre-amplifier 58 is provided at the input stage of the separator 34, but the present invention can be configured such that, for example, if the first and second variable gain amplifiers 54 and 56 can sufficiently amplify (attenuate) the servo data signal SS and the user data signal YS, the pre-amplifier 58 is not provided.

Figure 7:
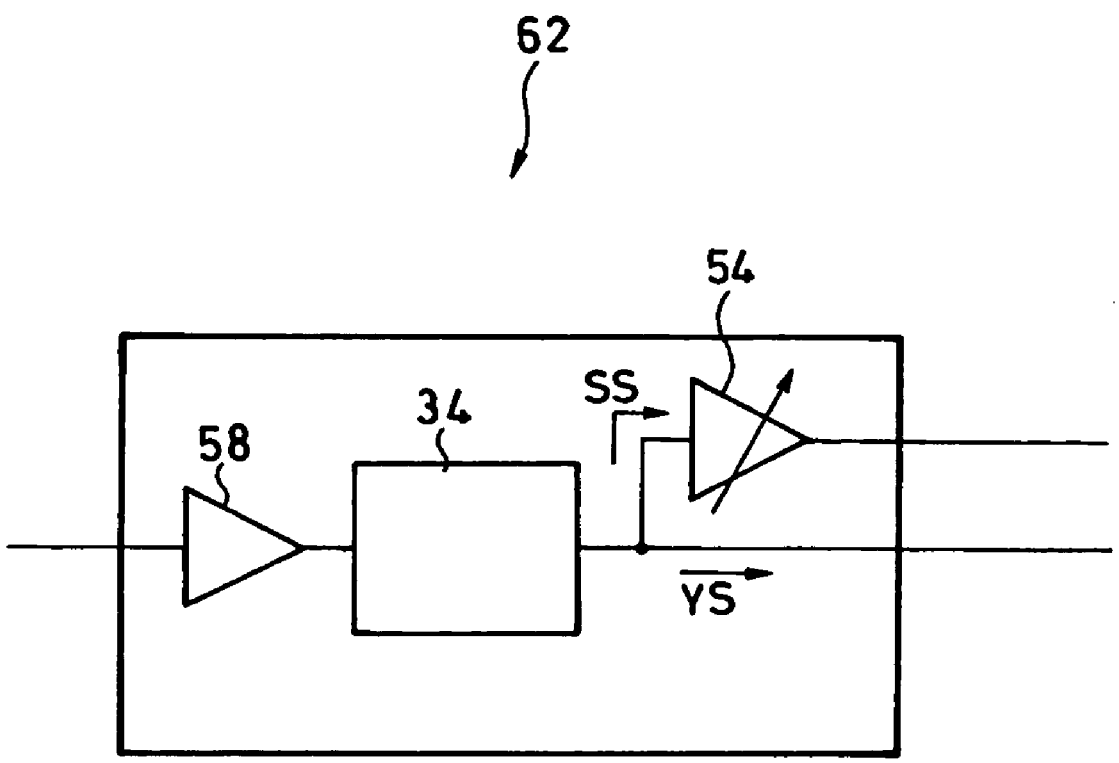
FIG. 7 is a block diagram of a head amplifier in a magnetic recording and reproducing apparatus according to a third exemplary embodiment of the present invention.

Next, a magnetic recording and reproducing apparatus according to a third exemplary embodiment of the present invention will be described with reference to FIG. 7.

The magnetic recording and reproducing apparatus 60 (not shown) according to the third exemplary embodiment comprises a head amplifier 62 in which the second variable gain amplifier 56 in the magnetic recording and reproducing apparatus 50 of the second exemplary embodiment described above is removed as shown in FIG. 7.

Figure 8A:
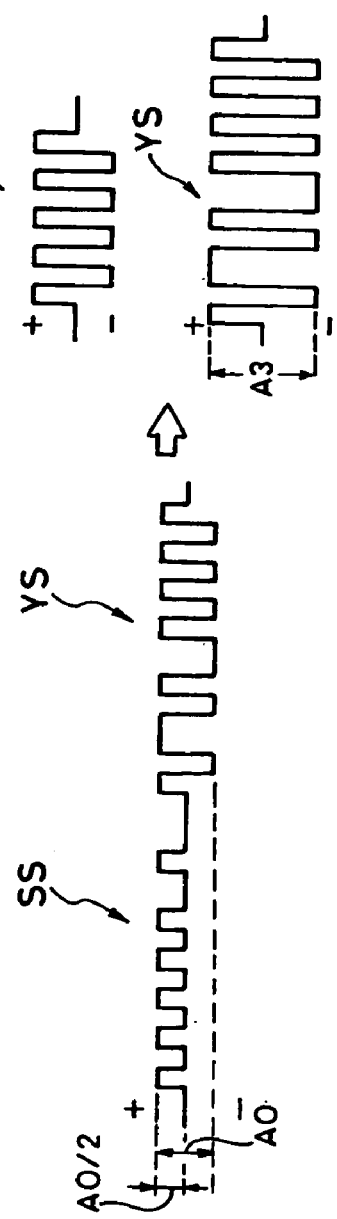
FIG. 8A schematically illustrates a reproducing signal before separation in the magnetic recording and reproducing apparatus in FIG. 7.
Figure 8B:
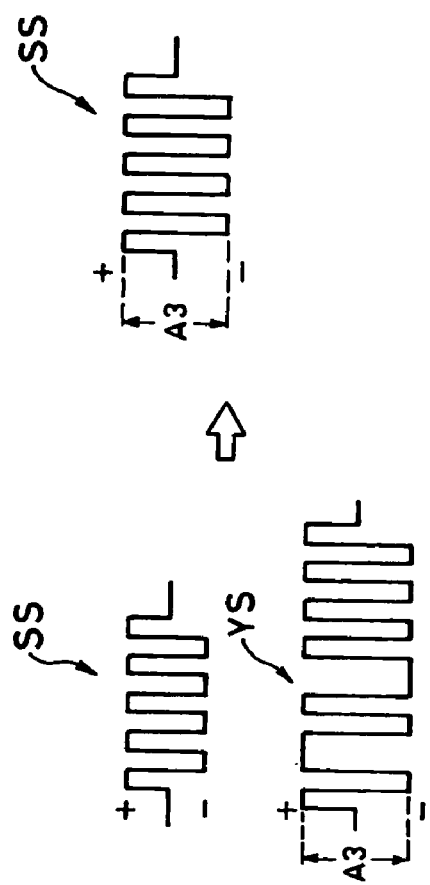
FIG. 8B schematically illustrates the reproducing signal after the separation and before gain adjustment in the magnetic recording and reproducing apparatus in FIG. 7.
Figure 8C:
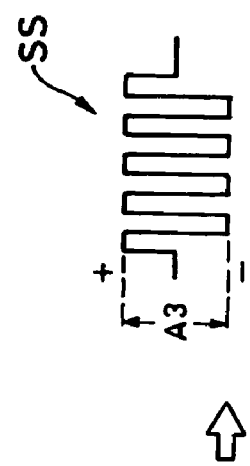
FIG. 8C schematically illustrates the reproducing signal after the gain adjustment in the magnetic recording and reproducing apparatus in FIG. 7.

In the magnetic recording and reproducing apparatus 60 of the third exemplary embodiment, the servo data signal SS and the user data signal YS reproduced by the reproducing head 14 are amplified by the pre-amplifier 58 and then separated from each other by the separator 34 as in the magnetic recording and reproducing apparatus 50 of the second exemplary embodiment described above. Then, the amplitude of the servo data signal SS separated by the separator 34 is amplified by the first variable gain amplifier 54, whereas the user data signal YS with an amplitude not being adjusted is output to the read and write channel 30. Accordingly, the servo data signal SS and the user data signal YS output from the head amplifier 62 produce waveforms shown in FIGS. 8B and 8C, respectively. Thus, an amplitude ratio of 1 (=A3/A3) obtained from the ratio between the servo data signal SS and the user data signal YS, both having an amplitude of A3, becomes greater than an amplitude ratio of ½ obtained from the ratio between the servo data signal SS having an amplitude of A0/2 and user data signal having an amplitude of A0, which have not yet been separated from each other as shown in FIG. 8A.

The magnetic recording and reproducing apparatus 60 of the third exemplary embodiment is configured such that only the amplitude of the servo data signal SS is amplified by the first variable gain amplifier (gain changing device) 54. Therefore, in addition to the same effect as in the magnetic recording and reproducing apparatus 10 of the first exemplary embodiment, the circuit configuration can be simplified in comparison with those in the magnetic recording and reproducing apparatuses 10 and 50 of the first and second exemplary embodiments.

Next, a magnetic recording and reproducing apparatus according to a fourth exemplary embodiment of the present invention will be described with reference to FIG. 9.

Figure 9:
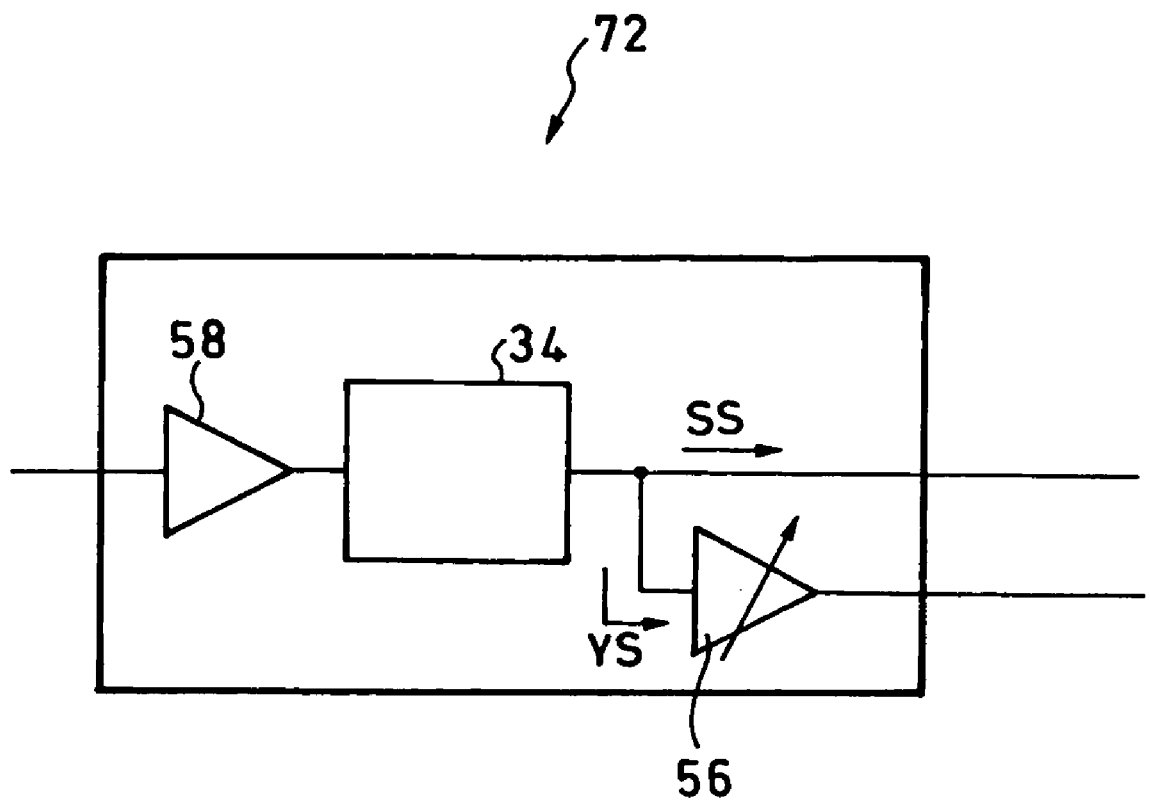
FIG. 9 is a block diagram of a head amplifier in a magnetic recording and reproducing apparatus according to a fourth exemplary embodiment of the present invention.

As shown in FIG. 9, the magnetic recording and reproducing apparatus 70 (not shown) according to the fourth exemplary embodiment comprises a head amplifier 72 in which the first variable gain amplifier 54 in the magnetic recording and reproducing apparatus 50 of the second exemplary embodiment described above is removed.

Figure 10A:
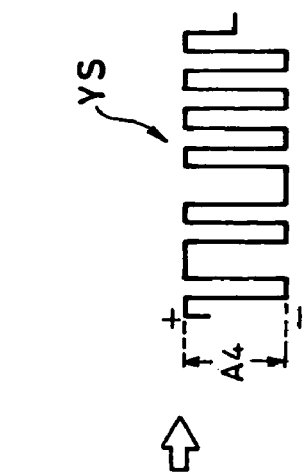
FIG. 10A schematically illustrates a reproducing signal before separation in the magnetic recording and reproducing apparatus in FIG. 9.
Figure 10B:
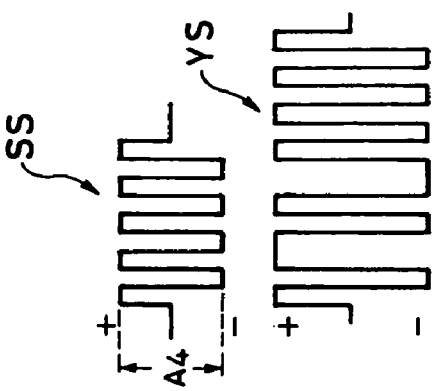
FIG. 10B schematically illustrates the reproducing signal after the separation and before gain adjustment in the magnetic recording and reproducing apparatus in FIG. 9.
Figure 10C:
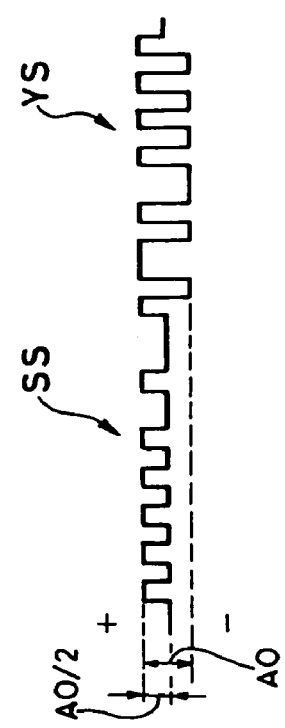
FIG. 10C schematically illustrates the reproducing signal after the gain adjustment in the magnetic recording and reproducing apparatus in FIG. 9.

In the magnetic recording and reproducing apparatus 70 of the fourth exemplary embodiment, the servo data signal SS and the user data signal YS reproduced by the reproducing head 14 are amplified by the pre-amplifier 58 and then separated from each other by the separator 34 as in the magnetic recording and reproducing apparatus 50 of the second exemplary embodiment described above. Then, the amplitude of the user data signal YS separated by the separator 34 is attenuated by the second variable gain amplifier 56, whereas the servo data signal SS with an amplitude not being adjusted is output to the read and write channel 30. Accordingly, the servo data signal SS and the user data signal YS output from the head amplifier 72 produce waveforms shown in FIGS. 10B and 10C, respectively. Thus, an amplitude ratio of 1 (=A4/A4) obtained from the ratio between the servo data signal SS and the user data signal YS, both having an amplitude of A4, becomes greater than an amplitude ratio of ½ obtained from the ratio between the servo data signal SS having an amplitude of A0/2 and user data signal having an amplitude of A0, which have not yet been separated from each other as shown in FIG. 10A.

The magnetic recording and reproducing apparatus 70 of the fourth exemplary embodiment is configured such that only the amplitude of the user data signal YS is attenuated by the second variable gain amplifier (gain changing device) 56. Therefore, in addition to the same effect as in the magnetic recording and reproducing apparatus 10 of the first exemplary embodiment described above, the circuit configuration can be simplified in comparison with those in the magnetic recording and reproducing apparatuses 10 and 50 of the first and second exemplary embodiments described above.

In the third and fourth exemplary embodiments described above, the first and second variable gain amplifiers 54 and 56 capable of adjusting the amplifications and attenuations are employed, but the present invention can be configured such that, for example, gain amplifiers having fixed amplifications or attenuations are employed.

Next, a magnetic recording and reproducing apparatus according to a fifth exemplary embodiment of the present invention will be described with reference to FIG. 11.

Figure 11:
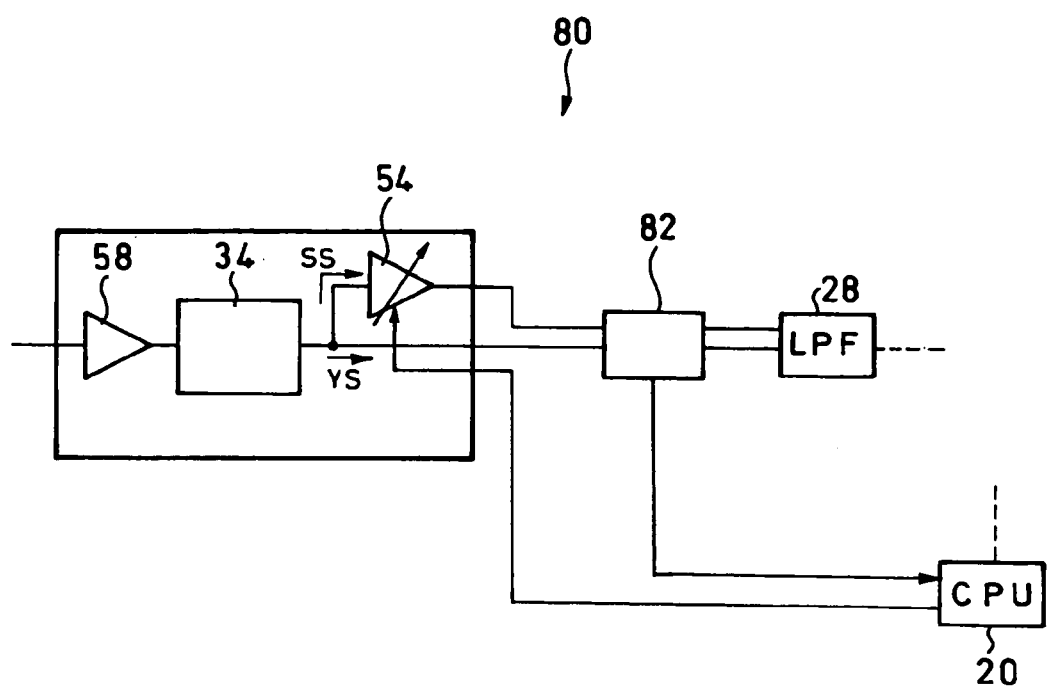
FIG. 11 is a block diagram of a magnetic recording and reproducing apparatus according to a fifth exemplary embodiment of the present invention.
Figure 12:
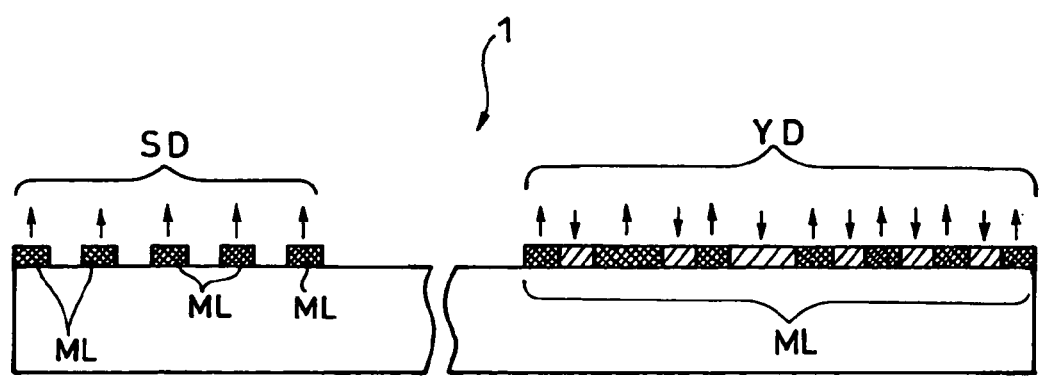
FIG. 12 is a cross-sectional view taken along the direction toward the track circumference, schematically illustrating a magnetization pattern of both the invented and conventional magnetic recording media (having a servo pattern formed using concavo-convex patterns)
Figure 13A:
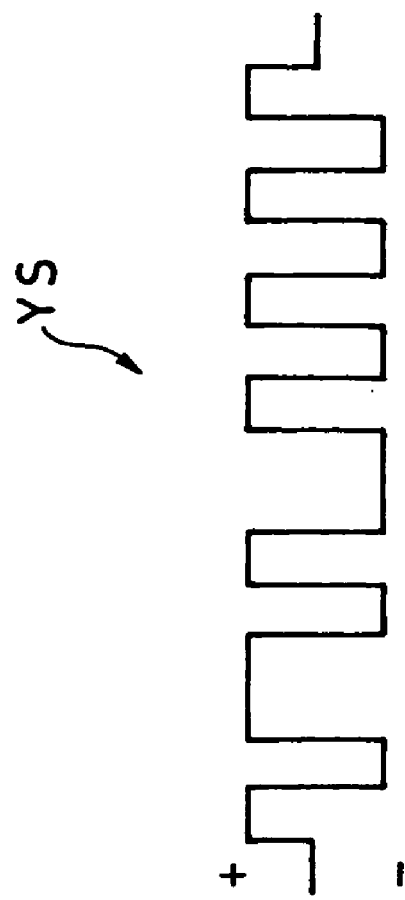
FIG. 13A schematically illustrates a waveform of a servo data signal in the magnetic recording and reproducing apparatus in FIG. 12.
Figure 13B:
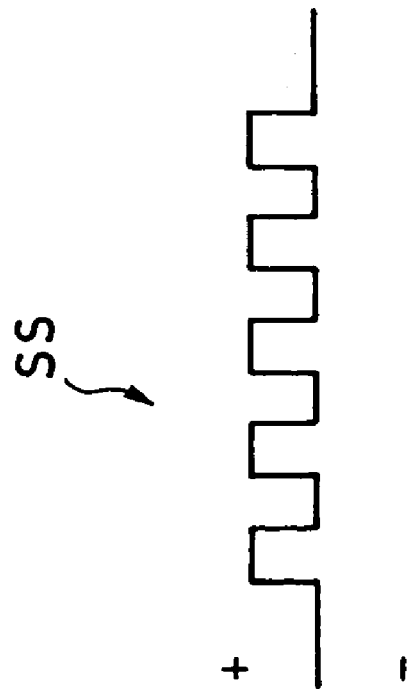
FIG. 13B schematically illustrates a waveform of a user data signal in the magnetic recording and reproducing apparatus in FIG. 12.

Referring to FIG. 11, in the magnetic recording and reproducing apparatus 80 (only partially shown) of the fifth exemplary embodiment, the amplification (or attenuation) of the first variable gain amplifier 54 in the magnetic recording and reproducing apparatus 60 of the third exemplary embodiment described above is controlled by the CPU 20.

The magnetic recording and reproducing apparatus 80 comprises an amplitude detector 82 connected to the CPU 20, capable of detecting the maximum amplitude of the servo data signal SS output from the first variable gain amplifier 54.

In the magnetic recording and reproducing apparatus 80, the CPU 20 compares the maximum amplitude of the servo data signal SS detected by the amplitude detector 82 with a preset reference amplitude of the servo data signal SS. Then, the CPU 20 can set an amplification (or attenuation) based on the difference between the maximum and reference amplitudes of the servo data signal SS to the first variable gain amplifier 54.

According to the magnetic recording and reproducing apparatus 80 of the fifth exemplary embodiment, it is not necessary to manually set the amplification (or attenuation) of the first variable gain amplifier 54. Moreover, for example, even if the amplitude of a reproducing signal has changed due to aging, the reproducing signal can be maintained in the best condition.

In the magnetic recording and reproducing apparatuses 50, 60, and 70 of the above second to fourth exemplary embodiments, the amplitudes of the first and second variable gain amplifiers 54 and 56 may also be configured such that they are controlled by the CPU as in the fifth exemplary embodiment.

The magnetic recording and reproducing apparatus according to the present invention can adopt configurations other than those shown as the magnetic recording and reproducing apparatuses 10, 50, 60, 70, and 80 according to the above first to fifth exemplary embodiments.

Accordingly, for example, the discrete track medium 12 can have shapes other than a disk shape.

Further, the separation device and the gain changing device may be integrally provided within a head amplifier, or may be separately provided.

Furthermore, the amplitude ratio AS1/AY1 between the servo data signal SS having an amplitude AS1 and the user data signal YS having an amplitude AY1 may take values other than 1. That is, the "gain changing device" according to the present invention may have any configurations as long as it can make the amplitude ratio AS/AY larger where AS and AY indicate the amplitudes of the servo data signal SS and the user data signal YS, respectively.

Furthermore, the magnetic recording medium according to the present invention may comprise any media other than the one having a plurality of recording tracks substantially concentrically formed by convex portions of a predetermined concavo-convex pattern which is formed by a magnetic layer, and having a user data section YD magnetically separated from each other by a plurality of grooves concentrically formed by the concave portions of a predetermined concavo-convex pattern as the discrete track media 12 according to the above first to fifth exemplary embodiments. That is, the magnetic recording medium according to the invention may be, for example, a so-called patterned medium having a user data section formed such that a magnetic layer is divided into meshes or dots (where, a plurality of recording tracks are magnetically separated also toward the circumference) to form convex portions (magnetic material portions) isolated into islands. The magnetic recording medium according to the invention may also be a magnetic recording medium having a user data section formed using a continuous magnetic layer, not having any concavo-convex patterns.

Furthermore, predetermined concavo-convex patterns formed in the servo data section may take any patterns, provided they are formed using a magnetic layer. The concavo-convex patterns may include, for example, magnetic layers formed so as to be physically isolated from each other, a magnetic layer continuously formed on a substrate having a concavo-convex pattern, and a continuous magnetic layer formed such that the residue of a magnetic layer remains in between the physically isolated magnetic layers having a projection shape (i.e., concave portions).

The magnetic recording and reproducing apparatus according to the present invention can be applied to magnetic recording and reproducing apparatuses having a magnetic recording medium such as a discrete track medium or other media.

What is claims is:

1. A magnetic recording and reproducing apparatus having a magnetic recording medium including a user data section capable of storing user data and a servo data section in which servo data is formed by a predetermined concavo-convex pattern formed by a magnetic layer, the magnetic recording and reproducing apparatus comprising:
    a separation device for separating a servo data signal and a user data signal, both reproduced by a reproducing head; and
    a gain changing device connected to an output stage of the separation device to increase an amplitude ratio AS/AY between the servo data signal having an amplitude AS and the user data signal having an amplitude AY.

2. The magnetic recording and reproducing apparatus according to claim 1, wherein
    the gain changing device is configured to amplify the amplitudes of the servo data signal and the user data signal with different amplifications, and an amplification to the servo data signal is set to greater than an amplification to the user data signal.

3. The magnetic recording and reproducing apparatus according to claim 2, wherein
    the amplification or attenuation of the gain changing device can be adjusted.

4. The magnetic recording and reproducing apparatus according to claim 3, wherein
    an average of the amplitude ratios is set to a value in a range of 70% to 100%.

5. The magnetic recording and reproducing apparatus according to claim 2, wherein
    an average of the amplitude ratios is set to a value in a range of 70% to 100%.

6. The magnetic recording and reproducing apparatus according to claim 2, further comprising an amplifying device connected to an input stage of the separation device to amplify the servo data signal and the user data signal before separating them.

7. The magnetic recording and reproducing apparatus according to claim 1, wherein
    the gain changing device is configured to attenuate the amplitudes of the servo data signal and the user data signal with different attenuations, and an attenuation to the servo data signal is set to less than an attenuation to the user data signal.

8. The magnetic recording and reproducing apparatus according to claim 7, wherein
    the amplification or attenuation of the gain changing device can be adjusted.

9. The magnetic recording and reproducing apparatus according to claim 7, wherein
    an average of the amplitude ratios is set to a value in a range of 70% to 100%.

10. The magnetic recording and reproducing apparatus according to claim 7, further comprising an amplifying device connected to an input stage of the separation device to amplify the servo data signal and the user data signal before separating them.

11. The magnetic recording and reproducing apparatus according to claim 1, wherein
    the gain changing device is configured to amplify only the amplitude of the servo data signal.

12. The magnetic recording and reproducing apparatus according to claim 11, wherein
    the amplification or attenuation of the gain changing device can be adjusted.

13. The magnetic recording and reproducing apparatus according to claim 11, wherein
    an average of the amplitude ratios is set to a value in a range of 70% to 100%.

14. The magnetic recording and reproducing apparatus according to claim 11, further comprising an amplifying device connected to an input stage of the separation device to amplify the servo data signal and the user data signal before separating them.

15. The magnetic recording and reproducing apparatus according to claim 1, wherein
    the gain changing device is configured to attenuate only the amplitude of the user data signal.

16. The magnetic recording and reproducing apparatus according to claim 15, wherein
    the amplification or attenuation of the gain changing device can be adjusted.

17. The magnetic recording and reproducing apparatus according to claim 15, wherein
    an average of the amplitude ratios is set to a value in a range of 70% to 100%.

18. The magnetic recording and reproducing apparatus according to claim 15, further comprising an amplifying device connected to an input stage of the separation device to amplify the servo data signal and the user data signal before separating them.

19. The magnetic recording and reproducing apparatus according to claim 1, wherein
    an average of the amplitude ratios is set to a value in a range of 70% to 100%.

20. The magnetic recording and reproducing apparatus according to claim 1, further comprising an amplifying device connected to an input stage of the separation device to amplify the servo data signal and the user data signal before separating them.

* * * * *